US012215765B2

(12) United States Patent
Cattoor et al.

(10) Patent No.: US 12,215,765 B2
(45) Date of Patent: Feb. 4, 2025

(54) LAYOUT SCHEME 1X1 POWERSHIFT TRANSMISSION WITH OUTPUT SPEED REDUCING RATIO

(71) Applicant: Dana Belgium N.V., Flanders (BE)

(72) Inventors: Kurt Cattoor, Koolkerke (BE); Filip D. Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 142 days.

(21) Appl. No.: 17/822,069

(22) Filed: Aug. 24, 2022

(65) Prior Publication Data

US 2024/0068553 A1   Feb. 29, 2024

(51) Int. Cl.
| F16H 37/06 | (2006.01) |
| B60K 17/08 | (2006.01) |
| B60K 17/28 | (2006.01) |
| F16H 3/08 | (2006.01) |

(52) U.S. Cl.
CPC .......... *F16H 37/065* (2013.01); *B60K 17/08* (2013.01); *B60K 17/28* (2013.01); *F16H 2003/0818* (2013.01); *F16H 2200/0004* (2013.01); *F16H 2200/0039* (2013.01)

(58) Field of Classification Search
CPC ........ B60K 17/28; B60K 5/1208; B60K 1/00; B60K 2001/001; B60K 2025/005; B60K 17/344; B60K 17/22; B60K 17/34; B60K 25/00; B60K 17/04; B60K 17/08; B60Y 2200/22; B60Y 2200/221; F16H 37/065; F16H 2200/0039; F16H 2003/0818; F16H 2200/0004; F16H 3/14
See application file for complete search history.

(56) References Cited

U.S. PATENT DOCUMENTS

| | | | | |
|---|---|---|---|---|
| 3,715,928 A * | 2/1973 | Case | ........................ | F16H 3/00 474/34 |
| 4,476,737 A * | 10/1984 | Young | ..................... | F16H 3/093 74/331 |
| 4,950,208 A * | 8/1990 | Tomlinson | ............ | F16H 47/065 474/71 |
| 5,385,064 A * | 1/1995 | Reece | ..................... | F16H 3/089 74/331 |
| 5,390,560 A * | 2/1995 | Ordo | ....................... | F16H 3/095 74/331 |
| 6,092,432 A * | 7/2000 | Klaricic | .............. | F16H 63/3026 74/331 |
| 6,616,559 B1 * | 9/2003 | Hori | ....................... | F16H 61/46 475/329 |
| 6,655,226 B2 * | 12/2003 | Oguri | ..................... | F16H 3/089 74/342 |
| 7,037,236 B2 * | 5/2006 | Ishibashi | ............... | F16H 61/439 477/52 |
| 7,063,638 B2 * | 6/2006 | Weeramantry | .......... | F16H 47/04 475/82 |
| 7,115,062 B2 | 10/2006 | Klemen | | |
| 7,467,564 B2 * | 12/2008 | Baldwin | ................ | F16H 63/18 74/330 |

(Continued)

*Primary Examiner* — Timothy Wilhelm
(74) *Attorney, Agent, or Firm* — McCoy Russell LLP (57) ABSTRACT

A transmission system is described having a first gear ratio coupling a forward clutch and a first shaft to an intermediate shaft, a second gear ratio coupling a reverse clutch and a first shaft to the intermediate shaft, and a third gear ratio coupling the intermediate shaft to an output shaft.

18 Claims, 4 Drawing Sheets

(56) References Cited

U.S. PATENT DOCUMENTS

| | | | |
|---|---|---|---|
| 7,771,314 B2* | 8/2010 | Eguchi | B60W 10/184 477/109 |
| 7,845,452 B2* | 12/2010 | Bennett | B60B 3/142 180/376 |
| 7,963,191 B2* | 6/2011 | Holmes | B60K 6/405 74/331 |
| 8,070,649 B2* | 12/2011 | Holmes | B60K 6/48 74/331 |
| 8,104,366 B2* | 1/2012 | Remmler | F16H 3/006 74/330 |
| 8,429,992 B2* | 4/2013 | Braford | F16H 3/093 74/331 |
| 8,474,342 B2* | 7/2013 | Thomas | F16H 3/006 74/331 |
| 8,474,343 B2* | 7/2013 | Thomas | F16H 3/006 74/331 |
| 8,567,273 B2* | 10/2013 | Mellet | F16H 3/006 74/331 |
| 8,763,485 B2* | 7/2014 | Thomas | F16H 3/006 74/330 |
| 8,844,391 B2* | 9/2014 | Braford | F16H 3/006 74/330 |
| 8,858,392 B2* | 10/2014 | Dix | F16H 61/4157 477/68 |
| 8,967,008 B2* | 3/2015 | Olson | F16H 3/12 74/331 |
| 8,967,009 B2* | 3/2015 | Mellet | F16H 3/093 74/331 |
| 8,992,378 B2* | 3/2015 | Holmes | B60K 6/387 192/84.6 |
| 9,097,342 B2* | 8/2015 | Dix | F16H 61/472 |
| 9,127,729 B2* | 9/2015 | Tao | F16D 48/062 |
| 9,145,959 B2* | 9/2015 | Otten | F16H 37/042 |
| 9,434,252 B2* | 9/2016 | Heindl | B60K 25/00 |
| 9,446,669 B2* | 9/2016 | Nakabayashi | B60K 6/387 |
| 9,829,072 B2* | 11/2017 | Osborn | F16H 3/093 |
| 10,696,289 B2* | 6/2020 | Shelton | B60W 10/08 |
| 2006/0048977 A1* | 3/2006 | Akashima | B62D 25/10 180/6.66 |
| 2007/0209902 A1* | 9/2007 | Muetzel | F16D 57/002 74/339 |
| 2010/0062893 A1* | 3/2010 | Antonov | F16H 3/66 475/275 |
| 2011/0088509 A1* | 4/2011 | Mohlin | F16H 3/006 74/665 E |
| 2011/0214521 A1* | 9/2011 | Rockenbach | F16H 3/089 74/331 |
| 2019/0301599 A1 | 10/2019 | Bulgrien | |
| 2022/0153132 A1 | 5/2022 | Sonoda et al. | |

* cited by examiner

LAYOUT SCHEME 1X1 POWERSHIFT TRANSMISSION WITH OUTPUT SPEED REDUCING RATIO

TECHNICAL FIELD

The present description relates generally to systems for a multi shaft transmission layout scheme with an output speed reducing gear ratio capable of 1×1 powershifting.

BACKGROUND AND SUMMARY

Vehicles, including a vehicle with work implements and off-highway work vehicles such as straddle carriers, forklifts, or tractors, have a drive train that may include a transmission, drive shaft, and a drive axle. Additionally, a vehicle may integrate a power take off (PTO) to transfer mechanically energy from a prime mover of a vehicle to operate and affect a work implement. The vehicle may maneuver frequently around objects and work in an environment with obstacles, thus accelerating and decelerating, with and without powershifting.

The process of powershifting allows for an output of a prime mover to remain or return to a faster RPM while the vehicle is decelerating or shifting to another gear. When the transmission of the vehicle switches to accelerate, the prime mover may be disengaged from the clutch, but rotate at a similar RPM allowing for similar torque to the output of the prime mover. The process of powershifting therein allows a vehicle to conserve torque from the prime mover output when switching to a new gear. A one to one transmission, or 1×1 transmission, may allow for the total ratio in a forward direction to be equal to the total ratio in reverse, therein allowing a vehicle to run at the same rotations per minute (RPM) in forward as reverse if the input speed remains constant. Power shifting via a 1×1 transmission, e.g., 1×1 powershifting, may allow for torque to be conserved while switching between moving in forward or reverse. Conserving the torque and speed of the prime mover output during deceleration or gear change allows the vehicle to reach a desired acceleration at a faster rate and maintain a similar traction before deceleration or a gear change. Such traction may be useful if the vehicle is transporting loads of a great weight relative to the weight of the vehicle and/or a maximum threshold weight the vehicle is rated to carry. Likewise, maintaining a similar output RPM in forward or reverse may improve control by an operator and prevent differences in traction while driving a vehicle forward versus reverse. Additionally, conservation of torque and speed of the prime mover output allows for a work vehicle to operate a PTO coupled to the prime mover with a larger torque while the vehicle decelerates.

A gear box and a PTO may be rated to handle loads below a maximum threshold of weight. To increase torque, durability of gear box components, and/or the maximum threshold of weight the diameters of gears and shafts of a gear box may be increased in size. The larger diameters of the gears and shafts may slow the speed of rotation and increase the torque. A greater torque may provide traction for a vehicle to move while carrying or the force for an implement for affecting a load of a greater weight. The increase in torque may allow a vehicle to carry or affect a greater maximum threshold of weight and be more resistance to sheer forces produced by a load of a greater weight. However, the volume of the gear box and transmission may be dependent on the diameter of the shafts and gears, as a larger gear ratio requires more volume to house. Typically, a gear box and a gear ratio of a PTO capable of handling loads of a heavier weight may take up considerable amount of volume. A larger diameter of shafts and gears may make volume reduction or rearrangement for a more compact gear box and transmission more difficult. Thus, the size and maneuverability of a vehicle may be less flexible.

If a gear box and PTO are to use the same amount of gears and shafts but of a smaller diameter, the volume may be reduced or rearranged more easily for a more compact gear box and transmission. However, the torque provided, may be more limited reducing the maximum threshold weight the vehicle can operate. Operating above or near the maximum threshold weight may result in sheer stress that components, such as the shafts, are unable to handle resulting in degradation. Thus, a vehicle with gears and shafts of a smaller diameter may be less capable carrying or affecting loads of a greater weight that may be common for a role.

The inventors herein have recognized these and other issues with such systems. As developed in one example is a transmission system comprising a first gear ratio coupling a forward clutch to an intermediate shaft, a second gear ratio coupling a reverse clutch to an intermediate shaft; and a third gear ratio coupling the intermediate shaft to an output shaft. The forward clutch and reverse clutch may be part of a single forward reverse clutch unit. The intermediate shaft may be connected to a first shaft from the motor, via a first gear ratio and a second gear ratio that may mechanically couple to the forward reverse clutch, wherein the second gear ratio may have an idler shaft and gear. The third gear ratio acts as speed reducer gear ratio to increase the torque transferred to the intermediate shaft before being output.

The additional gear ratio allows gears and some shafts, such as the first shaft and the intermediate shaft, to be reduced in diameter while still providing a similar amount of torque to the output shaft as a gear box with less gear ratios with gears of greater diameters. The intermediate shaft and speed reducer gear ratio may allow the output shaft to be placed in other regions such as directly below the intermediate shaft. The reduction of the diameter of first gear ratio and second gear ratio allows for the volume containing the gear ratios to be rearranged and reduced to be more compact along a desired axis. The speed reducer gear ratio may increase the torque and traction available for a vehicle to use. The forward and reverse clutch are used to allow for 1×1 power shifting.

Additionally, to further increase the compactness, the above-described configuration enables the gear ratio for the PTO to be integrated on the output of a prime mover, wherein the output gear for the PTO may circumferentially surround the shaft coupled to the output of a prime mover.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a compact gear box with a counter shaft capable of a 1×1 powershift in a 1×1 transmission. The transmission and gear box of are a 1×1, e.g., allowing the total ratio in a forward direction to be equal to the total ratio in reverse. The rotations per minute (RPM) of an output from the transmission forward may be the same as reverse if the input speed from the prime mover remains constant. There may be a first clutch, e.g. a forward clutch, and a second clutch, e.g., a reverse clutch, allowing for the ratio to be equal in forward and reverse.

The powershift may begin with the prime mover of the vehicle in a first power band. During the powershift, the driver does not let off the accelerator/torque/power request. A clutch for a gear shifter may be briefly depressed while a shift lever is rapidly shifted into another gear, keeping the prime mover in a first power band. Keeping the prime mover in a first power band allows for power in the form of mechanical energy to be transferred quicker when the clutch is "dropped" and power returns to the transmission. The process of powershifting allows for an output of a prime mover to remain or return to a faster RPM while the vehicle is decelerating or the transmission is changed to a different gear. For one example, when the transmission of the vehicle switches from decelerating to accelerating at the end of a power shift, the prime mover may be rotating at a similar RPM to before the gear shift. The similar RPM allows for a similar torque to from before the powershift to be transferred to the output of the prime mover and to a first shaft upon acceleration. Additionally, powershifting may reduce the time the driving wheels of a vehicle are unpowered allowing for quicker responses while shifting gears. The process of powershifting therein allows a vehicle to conserve torque from the prime mover output. Conserving the torque and speed of the prime mover output during deceleration of a vehicle allows a vehicle to maintain a similar traction before deceleration. Such traction may be useful if the vehicle is transporting loads of a great weight relative to the weight of the vehicle and/or a maximum threshold weight the vehicle is rated to carry. Additionally, conservation of torque and speed of the prime mover output allows for a work vehicle to affect loads with a powered implement, via a power take off (PTO) mechanically coupled to the prime mover, with a similar amount of torque while the vehicle decelerates.

Returning to FIGS. 1-4, the disclosed compact gear box gear box incorporates a forward reverse (F/R) shaft connected to an intermediate shaft via a first gear ratio and a second gear ratio, wherein the second gear ratio incorporates a counter shaft (e.g., an idler shaft). The intermediate shaft is further connected to an output shaft via a third gear ratio that acts as a speed reduction gear ratio to reduce the speed and increase the torque of the output shaft.

Additionally, this description relates to a gear ratio to supply a power take off (PTO) system for providing torque and mechanical energy to an implement. The output gear for the PTO may be transferred torque via a coupling to the output to a prime mover and circumferentially surround the shaft coupled to the prime mover output for the other components of the gear box. In example, the prime mover may be an electric motor. Alternatively, the prime mover may be an engine. While an engine may be described in examples below, it is understood that the present disclosure includes an example where an electric motor provides the input power in place of the engine.

Figure 1:
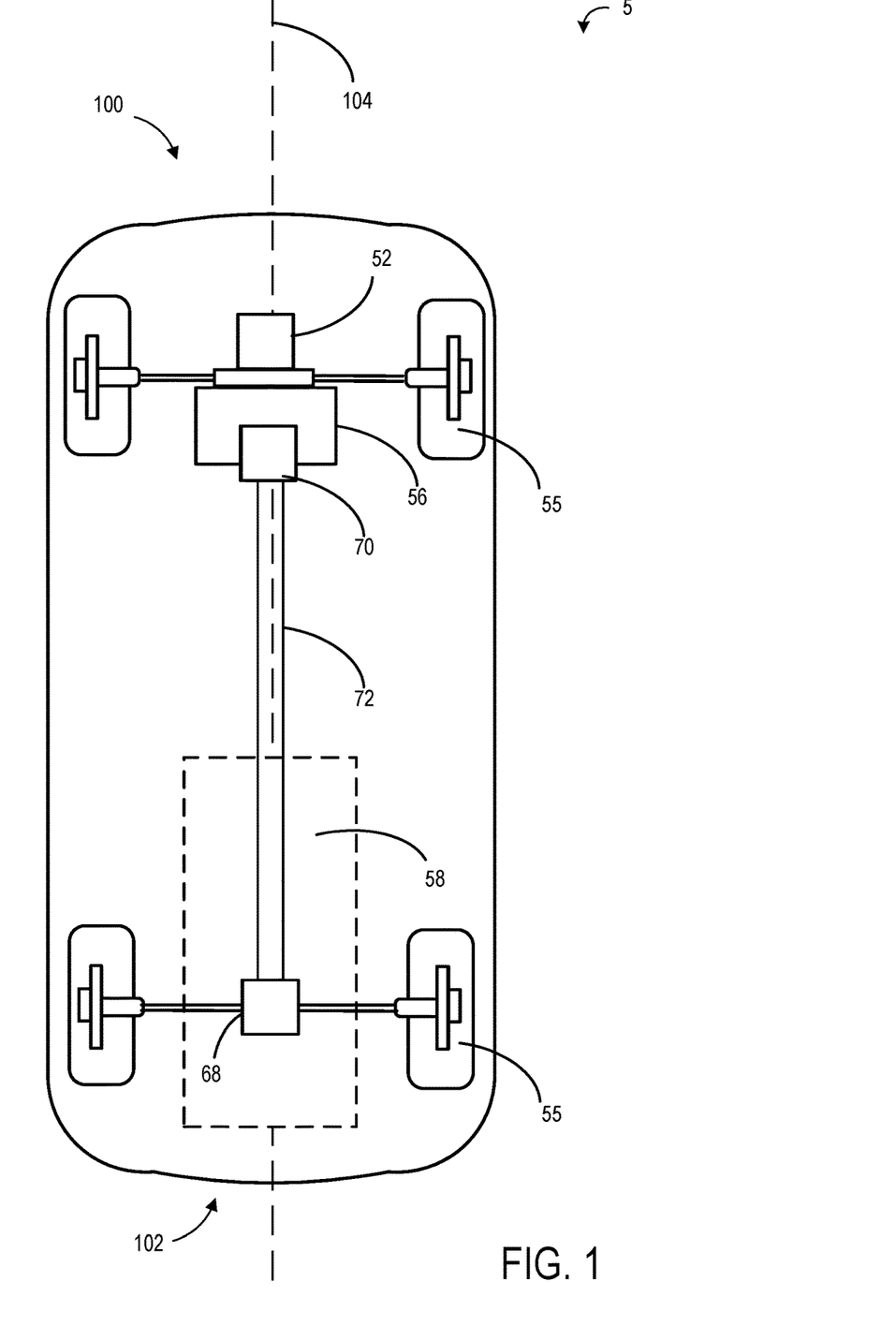
FIG. 1 shows an example schematic of a vehicle which may include a present disclosure gear box as part of the transmission.
Figure 2:
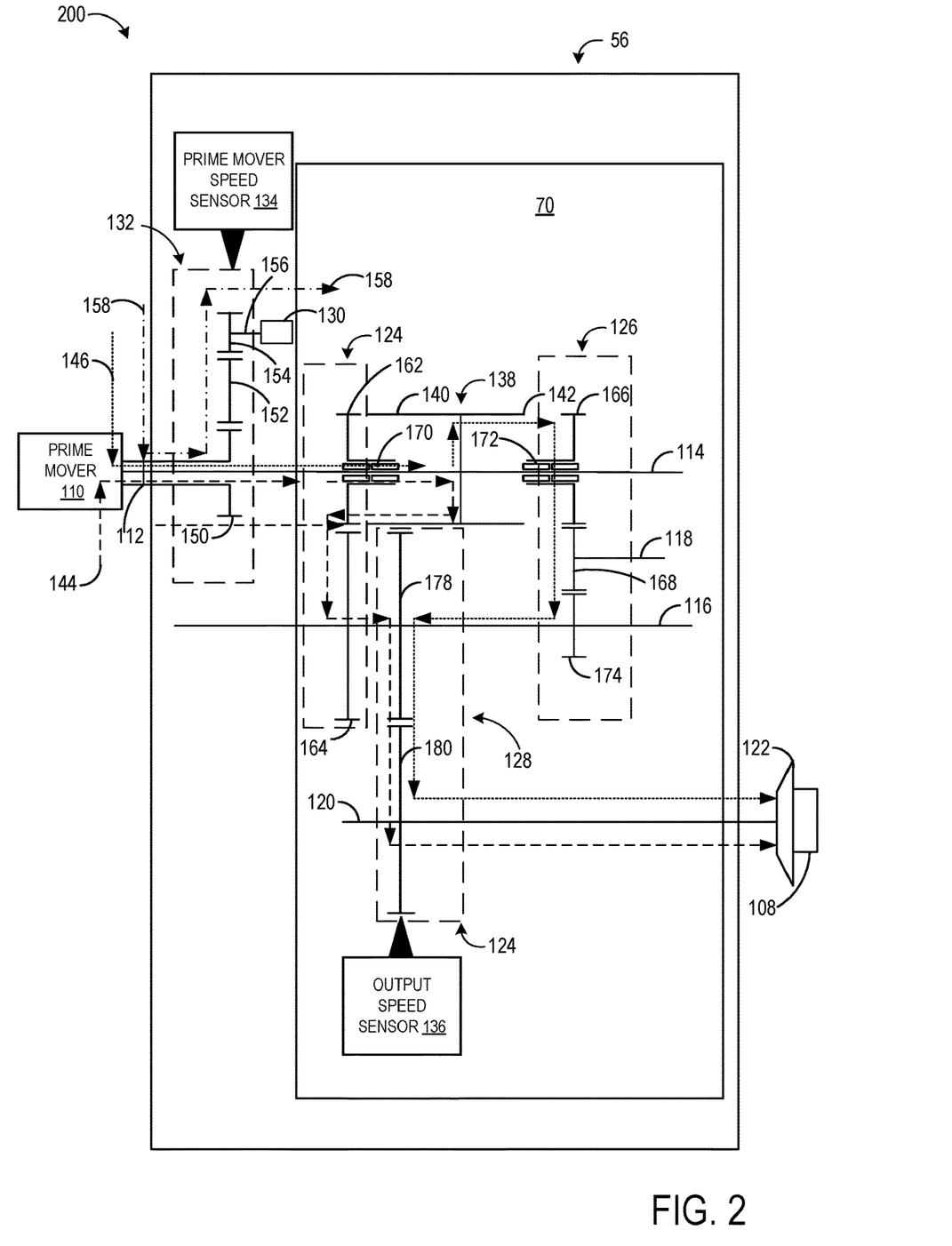
FIG. 2 shows an example schematic of the components of a present disclosure gear box.
Figure 3:
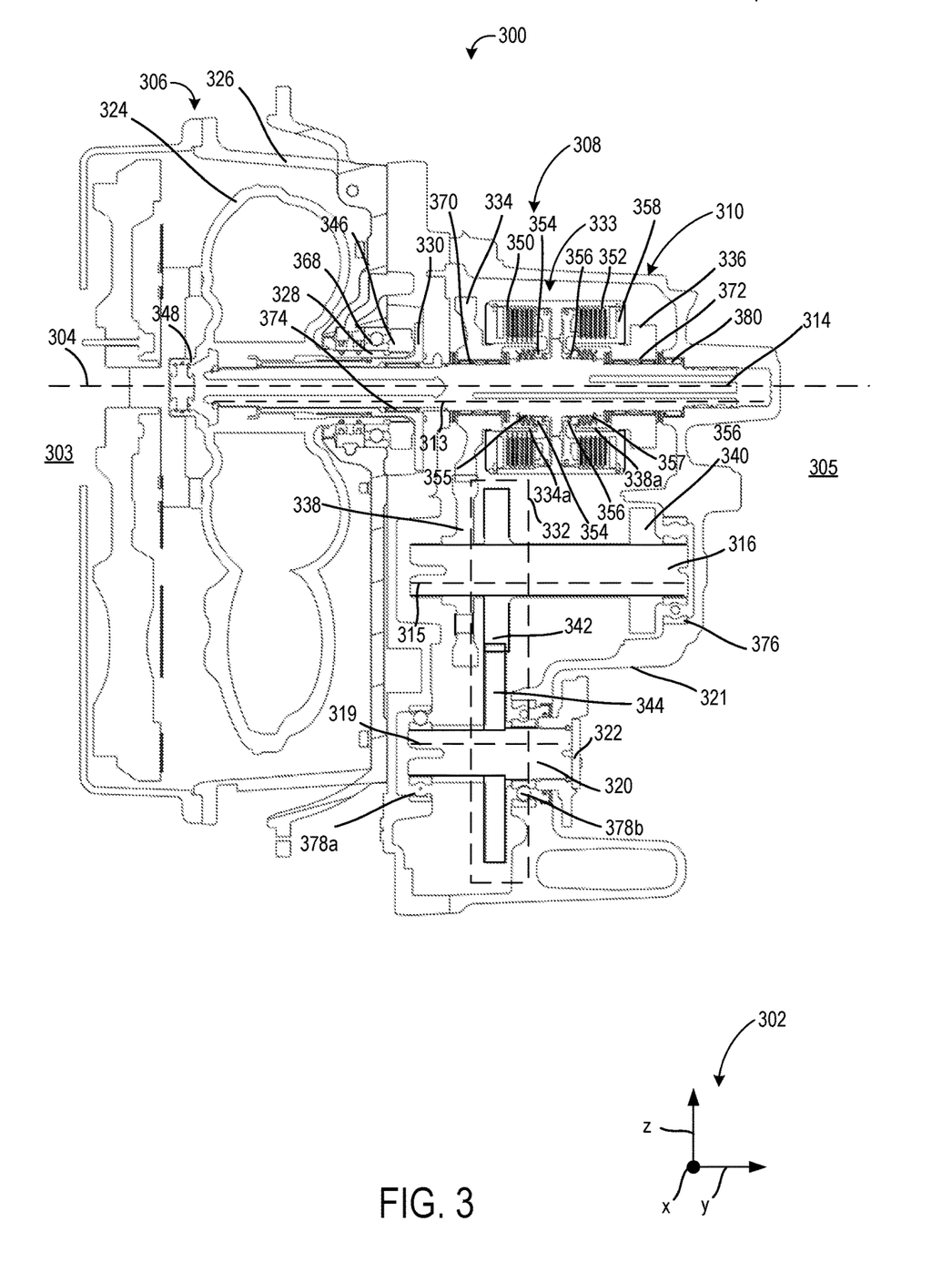
FIG. 3 shows a first cross-section cut out view from the side of an engine transmission unit and components of the present disclosure gear box.
Figure 4:
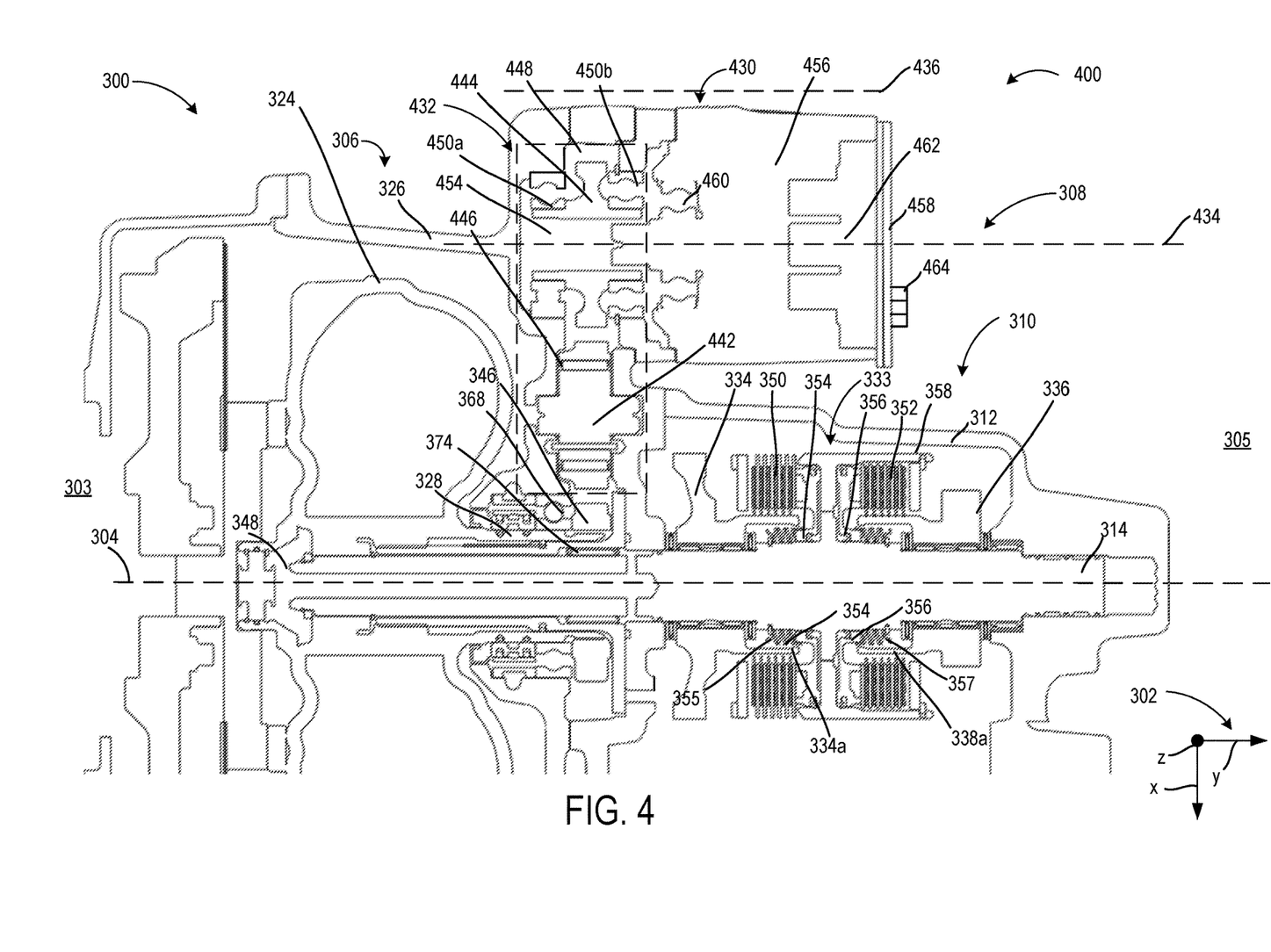
FIG. 4 shows a second cross-section cut out view from the top of an engine transmission unit with components of the present disclosure gear box and a power take off (PTO) unit.

A schematic of a vehicle is shown with a transmission that may contain an example gear box of the present disclosure as well as components, such as the wheels, the gear box may affect in FIG. 1. A schematic of components, such as gears, gear ratios, and shafts, of the transmission and a gear box of the present disclosure are shown in FIG. 2. FIG. 2 also shows a schematic of the components, such as gears and gear ratios, of the PTO system for transferring torque from the prime mover to implements. FIG. 3-4 shows a first cross-section cutout view and a second cross-section cutout view of an engine transmission unit incorporating a present disclosure gear box. The first cross-section view of FIG. 3 shows features and components of a forward reverse clutch and a speed gear reduction ratio from a side view. The second cross-section view of FIG. 4 shows the features and components of a PTO gear reduction ratio and a PTO unit from a top view.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIGS. 1-2 show schematics of example configurations with relative positioning of the various components. FIGS. 3-4 show example configurations with approximate position. FIGS. 3-4 are shown approximately to scale. However, it is to be appreciated that FIGS. 3-4 may be used to represent other relative dimensions. As used herein, the terms "approximately" is construed to mean plus or minus five percent of the range unless otherwise specified.

Further, FIGS. 3-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Turning to FIG. 1, an example vehicle 5 is shown. The vehicle 5 may have a front end 100 and a rear end 102, and may be bisected into two approximately symmetrical halves by a longitudinal axis 104.

In some examples, vehicle 5 may be a hybrid vehicle with multiple sources of torque available to one or more vehicle wheels 55. Alternatively, the vehicle 5 may include solely an internal combustion engine. In other examples, vehicle 5 may be an all-electric vehicle, powered exclusively by an energy storage device such as a battery 58.

In the example shown, vehicle 5 includes a prime mover 52. In one example the prime mover 52 may be an engine, such as an internal combustion engine. For this example, the prime mover 52 may receive a fuel such as gasoline or diesel to combust, converting chemical energy from the fuel into rotational energy.

In other examples the prime mover 52 may be an electric machine which may be an electric motor, an electric motor/generator, or an electric motor/engine. The prime mover 52 may receive electrical power from the battery 58 which is converted to rotational energy, e.g., torque, at a transmission 56. The torque may be delivered to vehicle wheels 55, which includes a set of front wheels proximate to a front end 100 of vehicle 5 and a set of rear wheels proximate to a rear end 102 of vehicle 5. Prime mover 52 may also be operated as a generator to provide electrical power to charge the battery 58, for example, during a braking operation.

FIG. 1 shows an embodiment prime mover 52 provides rotational energy to the wheels of vehicle 5 via the transmission 56. For this example, the embodiment of vehicle 5 has a prime mover 52 and the transmission 56 closest to the front end 100 of vehicle 5. A gear box 70 is incorporated into the transmission providing the transmission with different gears to select via a clutch. The gear box 70 and transmission 56 are 1×1 and symmetrical, allowing for similar RPMs to be transferred when the clutch is locked to move the vehicle 5 forward in the direction of the front end 100 or reverse in the direction of the rear end 102 if the input speed from the prime mover 52 remains constant. For this example, the prime mover 52 and transmission 56 may provide rotational energy to a drive shaft 72 to transfer rotational energy to a differential 68 to rotate the wheels 55 closest to the rear end 102. It will be appreciated that in other examples, rotational energy may be alternatively provided to the wheels 55 located near the front end 100 of vehicle 5. Furthermore, in other examples, each of the wheels 55 near the front end 100 and the wheels 55 near the rear end 102 may be coupled to individual transmissions, such as when vehicle 5 is configured with all-wheel drive. As well, in other embodiments, transmission 56 and/or prime mover 52 may be arranged closer to the rear end 102 of vehicle 5 rather than the front end 100.

The battery 58 may be between the vehicle wheels 55 and closer to the rear end 102 of vehicle 5 than the front end 100. For example, the battery 58 may be positioned below rear passenger seats of the vehicle. In another example, the battery 58 may be located in a floor of a rear compartment of the vehicle or may be integrated into a vehicle chassis. In other examples, however, the battery 58 may be located in a different relative position within vehicle 5 than shown in FIG. 1.

Turning to FIG. 2, it shows a schematic 200 components of the gear box 70 in the transmission 56 are shown attached to a prime mover 110. The prime mover 110 may be the same or similar to prime mover 52. The components of the gear box 70 form a part of a transmission system in the transmission 56.

The prime mover 110 may transfer mechanical energy via torque to a shaft 108 external to the gear box 70 via the transmission 56. The shaft 108 may be the same or similar to drive shaft 72. An output 112 extends from the prime mover 110 into the transmission 56 and gear box 70. The prime mover output 112 allows the prime mover 110 to transfer mechanical energy via torque into and through the components of the gear box 70 and transmission 56.

The prime mover output 112 may mechanically couple a forward reverse (F/R) shaft 114 that may act as a first shaft for the gear box 70. The F/R shaft 114 may be mechanically coupled to an intermediate shaft 116 via a first gear ratio 124. Additionally, the F/R shaft 114 may be mechanically coupled to an idler shaft 118 and the intermediate shaft 116 via a second gear ratio 126. The intermediate shaft 116 may be mechanically coupled to an output shaft 120 via a third gear ratio 128. The output shaft 120 may be coupled to an output flange 122 that may mechanically couple the output shaft 120 a shaft external to the gear box 70, such the drive shaft 72. When coupled via the output flange 122, the rotation of the output shaft 120 may transfer mechanical energy via torque and cause the external shaft to rotate. The intermediate shaft 116 may be and act as a halter shaft.

The first gear ratio 124 may transfer torque from the F/R shaft 114 to rotate the intermediate shaft 116 and output shaft 120 in a way to drive a vehicle, such as vehicle 5, in a first direction, e.g., a forward direction. The second gear ratio 126 may transfer torque from the F/R shaft 114 to rotate the intermediate shaft 116 and output shaft 120 in a way to drive a vehicle in a second direction, e.g., a reverse direction, opposite to the first direction.

The gear box 70 may also transfer power to an implement, such as a pump implement, via a power take off (PTO) connection 130, referred to herein as a PTO connection 130. A PTO gear ratio 132, may mechanically couple and transfer via torque between the prime mover output 112 of the prime mover 110 and the PTO connection 130.

Each successive gear ratio may increase the torque and decrease the speed of rotation. The larger the diameter of the gears in a gear ratio the greater the increase in torque and decrease in speed. The third gear ratio 128 may also be referred to as a speed reducer gear ratio due to reducing the speed and increasing the torque to the output shaft 120. The increase in torque by the third gear ratio 128 may allow for increased traction and increase the maximum weight a load may be acted upon by the vehicle compared to a gear box with gear ratios of similar dimension to the first and second gear ratios 124, 126 lacking a third gear ratio 128.

Additionally, the PTO gear ratio 132 may be monitored by a prime mover speed sensor 134 that may monitor and estimate the rotation per minute (RPM) of prime mover shaft and prime mover output 112. Similarly, an output speed sensor 136 may monitor and estimate the RPM of the output shaft 120.

The gear box has a forward reverse clutch unit 138 that may be used to mechanically couple the F/R shaft 114 to the first gear ratio 124 or the second gear ratio 126. The forward reverse clutch unit may be a singular unit located between a first gear of the first gear ratio 124 and a second gear of the second gear ratio 126. The forward reverse clutch unit 138 houses two clutches: a forward clutch 140 and a reverse clutch 142. The forward clutch 140 may lock (e.g., mechanically couple) with the first gear ratio 124 while the reverse clutch 142 may lock with the second gear ratio 126. When coupled to the forward clutch 140, the first gear ratio 124 may send torque to rotate the intermediate shaft 116 and output shaft 120 in a way to drive a vehicle, such as vehicle 5, in a forward direction. When coupled to the reverse clutch 142, the second gear ratio 126 may in a way to drive a vehicle in a reverse direction. The forward reverse clutch unit 138, forward clutch 140, and reverse clutch 142 allows the transmission to be a one to one transmission, e.g., 1×1 transmission. A 1×1 transmission allows for approximately the same or similar RPM and torque of the prime mover 110 to be transferred to the first gear ratio 124 from the forward clutch 140 as is transferred to the second gear ratio 126 from the reverse clutch 142.

The forward reverse clutch unit 138 may circumferentially surround the F/R shaft 114. Additionally, the F/R shaft 114 may be supported and circumferentially surrounded by a first bearing 170 of an A gear 162 and a second bearing 172 of a C gear 166.

When the forward clutch 140 is locked with the first gear ratio 124, the torque produced by the prime mover 110 may follow a first torque flow 144 through the first and third gear ratios 124, 128. When the reverse clutch 142 is locked with the second gear ratio 126, the torque produced by the prime mover 110 may follow a first torque flow 144 through the second and third gear ratios 126, 128.

Separate from the first and second torque flows 144, 146 is a PTO torque flow 158 that transfers torque through the components of the PTOxxx gear ratio 132 and to the PTO connection 130. The PTO torque flow 158 may first transfer torque from an engine output gear 150 mechanically coupled to the prime mover output 112. The engine output gear 150 may circumferentially surround and rotate about the F/R shaft 114. The engine output gear 150 mechanically couple to and have teeth intermesh with a first PTO gear 152. The first PTO gear 152 may mechanically couple to and have teeth intermesh with a second PTO gear 154. As torque from the PTO torque flow 158 transferred to and forces the engine output gear 150 to rotate, the engine output gear 150 may transfer torque to and force the first and second PTO gears 152, 154 to rotate. The second PTO gear 154 may be coupled to the PTO connection 130 via a PTO output 156. As torque is transferred into the second PTO gear 154, the second PTO gear 154 may transfer torque and force the PTO output 156 and PTO connection 130 to rotate. The torque may be transferred to and drive the components of a PTO implement mechanically coupled to the PTO connection 130. The PTO torque flow 158 may force the PTO output 156 and PTO connection 130 to rotate in the same direction of the prime mover output 112 with a higher torque and a slower RPM.

The first torque flow 144 and second torque flow 146 may transfer torque from the prime mover 110 to the F/R shaft 114 via the prime mover output 112. The first and second torque flows 144, 146 may be transferred from the F/R shaft 114 to the forward reverse clutch unit 138. The transfer of torque may cause the F/R shaft 114 and forward reverse clutch unit 138 to rotate with the prime mover output 112 of the prime mover 110.

The first gear ratio 124 is formed of an A gear 162 and a B gear 164. The A gear 162 may act as the first gear of the first gear ratio 124 with the forward reverse clutch unit 138. When the forward reverse clutch unit 138 is locked with the first gear ratio 124 the A gear 162 is locked with the with the forward clutch 140. The A Gear 162 may circumferentially surround and be supported by the first bearing 170. The first bearing allows the A gear 162 to rotate about the F/R shaft 114 while minimizing friction. The first torque flow 144 may transfer torque into and force the A gear 162 to rotate. The A gear 162 may be mechanically coupled to and have teeth intermeshed with the B gear 164. The rotation of the A gear 162 may transfer torque and force to the B gear 164 to rotate. The B gear 164 is mechanically coupled to the intermediate shaft 116. As torque is transferred to the B gear 164, the B gear 164 may transfer torque to and force the intermediate shaft 116 to rotate.

The second gear ratio 126 is formed of an C gear 166, a D gear 168, and an E gear 174. The C gear 166 may act as the second gear of the second gear ratio 126 with the forward reverse clutch unit 138. When the forward reverse clutch unit 138 is locked with the second gear ratio 126 the C gear 166 is locked with the with the reverse clutch 142. The C Gear 166 may circumferentially surround and be supported by the second bearing 172. The second bearing 172 allows the C gear 166 to rotate about the F/R shaft 114 while minimizing friction. The second torque flow 146 may transfer torque into and force the C gear 166 to rotate. The C gear 166 may be mechanically coupled to and have teeth intermeshed with the D gear 168. And the D gear 168 may be mechanically coupled to and have teeth intermeshed with the E gear 174.

The D gear 168 is mechanically coupled to the idler shaft 118. The idler shaft 118 may provide the D gear 168 with a counter torque. For example, when the vehicle is set to an idle state the reverse clutch 142 may couple to the C gear 166 and the idler shaft 118 may transfer a counter torque to the D gear 168. For this example, counter torque may rotate the D gear 168 opposite to the rotation of the C gear, reducing or counteracting the transfer of torque through the second gear ratio 126. For this example, the idler shaft 118 may prevent the transfer of torque to the intermediate shaft 116.

For an alternatively example, the idler shaft may not provide a counter torque, allowing for the second torque flow 146 to transfer mechanical energy to the intermediate shaft 116. For this example, torque may be transferred from the D gear 168 to the E gear 174. As torque is transferred from the D gear 168 to the E gear 174, the E gear 174 may transfer torque to and force the intermediate shaft 116 to rotate.

The first and second torque flows 144, 146 may transfer torque through the intermediate shaft 116 to the third gear ratio 128. The third gear ratio 128 is formed of a F gear 178 and a G gear 180. The F gear 178 is mechanically coupled to the intermediate shaft 116. As torque is transferred through the intermediate shaft 116, the intermediate shaft 116 may transfer torque into and force the F gear 178 to rotate. The F gear 178 may mechanically couple and have teeth intermeshed with the G gear 180. The rotation of the F gear 178 may transfer torque and force to the G gear 180 to rotate. The G gear 180 is mechanically coupled to the output shaft 120. As torque is transferred to the G gear 180, the G gear 180 may transfer torque to and force the output shaft 120 and output flange 122 to rotate.

The transfer of mechanical energy through gears in the gear ratios increases the torque and reduces the speed. The as mechanical energy is transferred via torque through a gear slows the RPM and the torque is increases, therein the torque of the G gear 180 to the output shaft 120 is greater than the torque of the F/R shaft 114 to the A gear 162. Each gear ratio has a pitch circle on which the spacing or tooth profile is formed and that the tooth proportions are constructed on. A gear with larger pitch diameter (e.g., diameter of the pitch circle) the more the speed of rotation of the gear will be slowed and the more the torque will be increased.

Additionally, the transfer of torque through gears may change the direction of torque. For one example, when torque is transferred along the first torque flow 144 via the first gear ratio 124 and third gear ratio 128, the intermediate shaft 116 may rotate in the opposite direction of the F/R shaft 114 while the output shaft 120 rotates in the same direction as the F/R shaft 114. For another example, when torque is transferred along the second torque flow 146 via the second gear ratio 126 and third gear ratio 128, the intermediate shaft 116 may rotate in the same direction as the F/R shaft 114 while the output shaft 120 rotates in the opposite direction as the F/R shaft 114. The idler shaft 118 and D gear 168 provides the second gear ratio 126 with a third gear to keep rotation and torque of the intermediate shaft 116 in the same direction as the F/R shaft 114. For this example, the two gears of the third gear ratio 128 may then change the direction of the rotation and torque of the output shaft 120 from the intermediate shaft 116.

A set of reference axes 302 are provided for comparison between views shown in FIG. 3-4. The reference axes 302 indicate a y-axis, an x-axis, and a z-axis. In one example, the z-axis may be parallel with a direction of gravity and the x-y plane may be parallel with a horizontal plane that an engine transmission unit 300 may rest upon. When referencing direction, positive may refer to in the direction of the arrow of the y-axis, x-axis, and z-axis and negative may refer to in the opposite direction of the arrow of the y-axis, x-axis, and z-axis. An arrow represented by a filled circle may represent an axis facing toward, or positive to, a view. An arrow represented by an unfilled circle may represent an axis facing away, or negative to, a view.

Turning to FIG. 3, it shows a first cross-section cutout view 301 of an engine transmission unit 300 located between a first side 303 and a second side 305. The engine transmission unit 300 may be aligned along a longitudinal axis 304, such that the longitudinal axis 304 may be approximately parallel with the y-axis of the reference axes. The first cross-section cutout view 301 may be taken from the side along the x-axis.

For this example, the engine transmission unit 300 may be formed of an engine 306 and a transmission 308. The engine 306 may be the same or similar to the prime mover 110 and located near the first side 303. The transmission 308 may be housed in a transmission housing 312, located near the second side 305, and be the same or similar to the transmission 56. The transmission 308 contains a gear box 310 that may be the same or similar to the gear box 70. The components of the gear box 310 comprise a transmission system of transmission 308.

The gear box 310 encloses or partially encloses components mechanically coupled to a plurality of shafts. An F/R shaft 314, that may be the same or similar to the F/R shaft 114, may extend from the engine 306 and into the gear box 310. The F/R shaft 314 may be aligned with the longitudinal axis 304 such that a length 313 of the F/R shaft 314 is approximately parallel and collinear with the longitudinal axis 304. Additionally, the gear box 310 may contain an intermediate shaft 316 that may be the same or similar to intermediate shaft 116 and an output shaft 320 that may be the same or similar to the output shaft 120. A length 315 of the intermediate shaft 316 and a length 319 of the output shaft 320 may be approximately parallel with the longitudinal axis 304 and for this example the y-axis.

The gear box 310 may enclose and have components coupled to an idler shaft similar to idler shaft 118 not visible in the first cross-section cutout view 301 of engine transmission unit 300. The output shaft 120 may be coupled to an output flange 322 that is and functions the same or similar to the output flange 122.

For the example shown in FIG. 3, the length 315 of the intermediate shaft 316 may be greater than the length 319 of the output shaft 320. For the example shown in FIG. 3, the intermediate shaft 316 may be located below the F/R shaft 314 with respect to the y-axis. Likewise, for this example, the output shaft 320 may be located below the intermediate shaft 316. For this example, such an arrangement allows for a recess 321 to be formed in the gear box 310 and transmission housing 312 below the intermediate shaft 316. A portion of a drive shaft of a vehicle, such as drive shaft 72 of vehicle 5, may fit below the transmission 308, with respect to the z-axis, and in the recess 321 when coupled to the output flange 322. For this example, a vehicle using the engine transmission unit 300 may be reduced in length as the longitudinal length of a drive shaft may be partially within the longitudinal length of the engine transmission unit 300.

The intermediate shaft 316 and output shaft 320 may be mechanically coupled to components of the speed reducer gear ratio 332. The speed reducer gear ratio 332 may be and function the same or similar to the third gear ratio 128. For the example in FIG. 3, the speed reducer gear ratio 332 may be located below the F/R shaft 314 with respect to the z-axis.

A portion of the F/R shaft may be circumferentially surrounded by a converter 324. The converter 324 may be housed in the component housing 326 of the engine 306. An engine converter output 328 is a portion of the converter 324 extends away from the engine along the longitudinal axis 304 toward and into the transmission 308. The engine converter output 328 may serve as a coupling site for components of the engine transmission unit 300. The engine converter output 328 may circumferentially surround a portion of the F/R shaft 314 and an F/R sleeve 330. The F/R sleeve 330 may be located between the engine converter output 328 and the F/R shaft 314 with respect to the z-axis, wherein the F/R sleeve 330 may circumferentially surround a portion of the F/R shaft 314. The F/R sleeve 330 may form into a flange that may shield other components such as the outer F/R shaft bearing 368 and an engine output gear 346 from forces parallel to the longitudinal axis from the transmission 308.

The gear box may contain a forward reverse clutch 333 that may be and function the same or similar to the forward reverse clutch unit 138. The forward reverse clutch 333 may circumferentially surround a portion of the F/R shaft 314.

The gear box 310 may contain a plurality of gear cavities that may house a plurality of gears. The gear box 310 may contain an A gear 334 that is the same or similar to A gear 162; a B gear 336 that is the same or similar to B gear 164; a C gear 338 that is the same or similar to C gear 166; an E gear 340 that is the same or similar to E gear 174; an F gear 342 that is the same or similar to F gear 178; and a G gear 344 that is the same or similar to G gear 180. The gear box 310 may also contain a D gear that is the same or similar to D gear 168 not shown in FIG. 3.

The A gear 334 and C gear 338 may circumferentially surround the F/R shaft 314 and be enclosed by the gear box 310 and transmission housing 312. The A gear 334 may be located closest to the engine 306 while the C gear 338 may be furthest from the engine 306 along the longitudinal axis 304. The forward reverse clutch 333 may be located between the A gear 334 and C gear 338 with respect to the longitudinal axis 304 and for this example the y-axis.

The B gear 336, E gear 340, and F gear 342 may be located below the F/R shaft 314 and circumferentially surround and couple to the intermediate shaft 316. The B gear 336 may be located below and intermesh with the A gear 334 with respect to the z-axis, and the E gear 340 may be located below the C gear 338 with respect to the z-axis. The A gear 334 and B gear 336 may be coplanar with a first plane formed of the x and y axes parallel with the z axis and closer to the first side 303. The C gear 338 and E gear 340 may be coplanar with a second plane formed of the x and y axes parallel with the z axis and closer to the second side 305. The F gear 342 may be located between the B gear 336 and E gear 340 with respect to the longitudinal axis 304 and for this example the y-axis. The G gear 344 may be located below and intermesh with the F gear 342 with respect to the z-axis. The G gear 344 and F gear 342 may form the speed reducer gear ratio 332. Located between the engine 306 and transmission 308 is an engine output gear 346. The engine output gear 346 may circumferentially surround and be supported by the F/R sleeve 330. The engine output gear 346 may be the same or similar to the engine output gear 150. The F/R shaft 314 and converter 324 may be coupled to the engine via an engine output 348 that may be the same or similar to the prime mover output 112. The engine output gear 346 may rotate with the F/R sleeve 330 and the converter 324 about the longitudinal axis 304 and F/R shaft. The F/R sleeve 330 may be supported and circumferentially surround a first F/R shaft bearing 374, preventing friction between the F/R sleeve 330 and F/R shaft 314. The engine converter output 328 may be supported by and circumferentially surrounded by an outer F/R shaft bearing 368, preventing friction between the engine converter output 328 and the component housing 326.

The forward reverse clutch 333 is housed in a clutch cavity 358 in the gear box 310. The forward reverse clutch 333 may act as a single unit containing multiple components. The forward reverse clutch 333 has a forward clutch 350 and a reverse clutch 352 that may be and function the same or similar to the forward clutch 140 and reverse clutch 142, respectively. A plurality of forward clutch pistons 354 and reverse clutch pistons 356 may extend when pressure is increased via filling the pistons 354, 356 with actuating fluid. The extension of the forward clutch pistons 354 may lock the forward clutch 350 with the A gear 334. The extension of the reverse clutch pistons 356 may lock the reverse clutch 352 with the B gear 336. When actuating fluid is removed from and pressure is lowered in the pistons 354, a plurality of springs 355 may force pistons 354 to retract and unlock the clutch 350 with the A gear 334. When actuating fluid is removed from the pistons 356, a plurality of springs 357 may force pistons 356 to retract and unlock the reverse clutch 352 with the B gear 336. The forward clutch 350, reverse clutch 352, forward clutch pistons 354, and reverse clutch pistons 356 may be located between the A gear 334 and C gear 338. The forward clutch 350 and forward clutch pistons 354 may be located closest to the first side 303 and the A gear 334. The reverse clutch 352 and reverse clutch pistons 356 may be located closest to the second side 305 and C gear 338. The forward clutch 350 may and coupled to an output segment 334a of the A gear 334. The reverse clutch 352 may lock with the output segment 338a of the C gear 338. The forward clutch 350 and reverse clutch 352 are positioned with the A gear 334 and B gear 336 to transfer the same RPM and torque to both allowing for 1×1 powershifting.

The forward reverse clutch 333 contains a first clutch bearing 370 and a second clutch bearing 372 that may be the same or similar to the first and second bearings 170, 172, respectively. The first clutch bearing 370 may support and be circumferentially surrounded by the A gear 334. The second clutch bearing 372 may support and be circumferentially surrounded by the C gear 338. Additionally, there may be a first F/R shaft bearing 374 and a second F/R shaft bearing 380 may support and circumferentially surround the F/R shaft 314, allowing the F/R shaft 314 to rotate about the longitudinal axis 304 while preventing friction. The first F/R shaft bearing 374 may be located closer to the engine 306 from the first clutch bearing 370 with respect to the longitudinal axis 304 and y-axis. The first F/R shaft bearing 374 may also be circumferentially surrounded by the F/R sleeve 330. The second F/R shaft bearing 380 may be located further from the engine 306 than the second clutch bearing 372 and the first F/R shaft bearing 374. An intermediate shaft bearing 376 may circumferentially surround and support the end of the intermediate shaft 316 closest to the E gear 340. Likewise, a first output shaft bearing 378a and a second output shaft bearing 378b may circumferentially surround and support the output shaft 320. The first clutch bearing 370, second clutch bearing 372, first F/R shaft bearing 374, second F/R shaft bearing 380, intermediate shaft bearing 376, first output shaft bearing 378a, and second output shaft bearing 378b may function similarly, preventing friction between their respective shafts and the gear box 310.

Turning to FIG. 4, it shows a second cross-section cutout view 400 of the engine transmission unit 300. The second cross-section cutout view 400 shows the internal components of a power take off unit (PTO) unit 430 and a PTO gear ratio 432. The second cross-section cutout view 400 may be taken from the top along the z-axis. The PTO gear ratio 432 may be the same or similar to the PTO gear ratio 132 and may be formed by components enclosed by a segmented rectangle in FIG. 4. Likewise, the PTO unit 430 contains components of the PTO connection 130 and the PTO output 156. The PTO gear ratio 432 may be located between the engine 306 and the PTO unit 430 with respect to the longitudinal axis 304 and y-axis. For one example, the PTO unit 430 may be located above the gear box 310, the F/R shaft 314, and the longitudinal axis 304 with respect to the x-axis. However, it is to be appreciated that the location of the PTO unit 430 may be non-limiting. For other examples the PTO unit 430 may be located above the gear box 310, the F/R shaft 314, and the longitudinal axis 304 with respect to the z-axis.

The PTO unit 430 may be of a length 436 and be centered along an axis of rotation 434. The PTO unit 430 aligned with the axis of rotation 434 such that the length 436 of the PTO unit 430 is approximately parallel with the axis of rotation 434. The axis of rotation 434 is approximately parallel with the longitudinal axis 304.

The PTO gear ratio 432 is formed of the engine output gear 346, a first PTO gear 442, and a second PTO gear 444. The engine output gear 346 and first PTO gear 442 are mechanically coupled with intermeshed teeth, and the first PTO gear 442 and second PTO gear 444 are mechanically coupled with intermeshed teeth. For example, the first PTO gear 442 may be located above the engine output gear 346 and the second PTO gear 444 is located above the first PTO gear 442 with respect to the x-axis. However, it is to be appreciated that the location of the first PTO gear 442 and second PTO gear 444 relative to the engine output gear 346 may be non-limiting. For other examples, the first PTO gear 442 may be located above the engine output gear 346 and the second PTO gear 444 is located above the first PTO gear 442 with respect to the z-axis.

The first PTO gear 442 may be the same or similar to the first PTO gear 152 and housed within a first PTO gear cavity 446 formed between the engine 306 and transmission 308. The second PTO gear 444 may be the same or similar to the second PTO gear 154 and housed within a second PTO gear cavity 448 formed in the PTO unit 430. The second PTO gear has segments circumferentially surrounded and supported by a second PTO gear first bearing 450a and a second PTO gear second bearing 450b, allowing the second PTO gear 444 to rotate.

The second PTO gear 444 may be mechanically coupled to a PTO shaft 456 via a PTO output 454. The second PTO gear 444 may be located closer to the first side 303 and engine 306 from the PTO shaft 456 with respect to the longitudinal axis 304 and y-axis. The PTO shaft 456 may be coupled to a PTO unit flange 458 via a PTO flange output 462. The PTO shaft 456 may be located between the PTO unit flange 458 and second PTO gear 444 with respect to the longitudinal axis 304 and y-axis. The PTO shaft 456 may be supported by a PTO shaft bearing 460, allowing the PTO shaft 456 and PTO unit flange 458 to rotate about the axis of rotation 434. A PTO port 464 may be located on the side of the PTO unit flange 458 closest to the second side 305. The PTO shaft 456 may be located on side of the PTO unit flange 458 closest to the first side 303. The PTO port 464 may mechanically and fluidically couple to a PTO instrument, such as a pumping implement.

Torque from the engine 306 may drive and power the PTO unit 430. For example, torque may be transferred from the engine output 348 to the engine output gear 346 via the engine converter output 328. The transfer of torque may force the engine output gear 346 to rotate. For this example, torque may be transferred through the PTO gear ratio 432 by the engine output gear 346, and may force the first and second PTO gears 442, 444 to rotate. The rotation of the second PTO gear 444 may transfer torque to and force the PTO shaft 456 and PTO unit flange 458 to rotate about the axis of rotation 434. For this example, the PTO unit flange 458 may transfer torque and force the rotation of PTO implements or other components attached via the PTO port 464.

Thus, disclosed herein are systems and components for a compact gear box of a powershift transmission for operations in a vehicle that may provide a 1×1 powershift and power to a power take off system for an implement. The compact gear box may provide increased traction and torque relative to other gear boxes of a similar volume with first and second gear ratios lacking a speed reducer gear ratio and intermediate shaft.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
a first gear ratio coupling a forward clutch and a first shaft to an intermediate shaft;
a second gear ratio coupling a reverse clutch and the first shaft to the intermediate shaft;
a third gear ratio coupling the intermediate shaft to an output shaft, the output shaft extending from the transmission system; and
an output of a mover, the output surrounding the first shaft, wherein the forward clutch locks the first shaft to a first gear of the first gear ratio and the reverse clutch locks the first shaft to a second gear of the second gear ratio,
wherein the second gear ratio includes an idler shaft which couples the reverse clutch to the intermediate shaft, wherein the first shaft is a forward reverse shaft and the forward clutch and the reverse clutch surround the first shaft, and wherein the first shaft supports the forward clutch and the reverse clutch via bearings.

2. The transmission system of claim 1, wherein the third gear ratio is a speed reducer gear ratio.

3. The transmission system of claim 2, wherein the output shaft includes an output speed sensor and an output flange.

4. The transmission system of claim 2, wherein the first shaft is mechanically coupled to the output of the mover, and the mover is a prime mover, and the prime mover is located above the intermediate shaft, wherein an output gear for a PTO circumferentially surrounds the first shaft and is coupled to the output of the prime mover, and wherein the first shaft locks to the first gear and rotates in a first direction to rotate the output shaft in the first direction, and the first shaft locks to the second gear and rotates in a second direction opposite to the first direction to rotate the output shaft in the first direction.

5. The transmission system of claim 4, wherein the first shaft and the output of the prime mover are mechanically coupled to the first gear ratio and the intermediate shaft via the forward clutch.

6. The transmission system of claim 4, wherein the first shaft and the output of the prime mover are mechanically coupled to the second gear ratio and the intermediate shaft via the reverse clutch.

7. The transmission system of claim 1, wherein the forward clutch and the reverse clutch are formed as a single unit.

8. The transmission system of claim 7, wherein the single unit is located between the first gear and the second gear.

9. The transmission system of claim 1, wherein the intermediate shaft is located above the output shaft, and the first gear ratio and the second gear ratio are located above the third gear ratio, with respect to the direction of gravity when installed in a vehicle.

10. The transmission system of claim 1, wherein the idler shaft is located below the first shaft and above the intermediate shaft, with respect to the direction of gravity when installed in a vehicle.

11. A transmission system, comprising:
a first gear ratio coupling a forward clutch and a first shaft to an intermediate shaft;
a PTO output gear;
an output of a prime mover, wherein the first shaft is mechanically coupled to and surrounded by the output and is located above the intermediate shaft;
a second gear ratio coupling a reverse clutch and the first shaft to the intermediate shaft; and
a third gear ratio coupling the intermediate shaft to an output shaft, wherein the PTO output gear circumferentially surrounds the output of the prime mover and the first shaft,
wherein the second gear ratio includes an idler shaft which couples the reverse clutch to the intermediate shaft, wherein the first shaft is a forward reverse shaft and the forward clutch and the reverse clutch surround the first shaft, and wherein the first shaft supports the forward clutch and the reverse clutch via bearings.

12. The transmission system of claim 11, wherein the second gear ratio includes an idler shaft which couples the reverse clutch to the intermediate shaft, and wherein the first shaft is a forward reverse shaft.

13. The transmission system of claim 11, wherein the third gear ratio is a speed reducer gear ratio.

14. The transmission system of claim 11, wherein the output shaft includes an output speed sensor and an output flange.

15. The transmission system of claim 11, wherein the first shaft and the output of the prime mover are rotatably coupled to the first gear ratio and the intermediate shaft via the forward clutch.

16. The transmission system of claim 11, wherein the first shaft and the output of the prime mover are mechanically coupled to the second gear ratio and the intermediate shaft via the reverse clutch.

17. The transmission system of claim 16, wherein the forward clutch and the reverse clutch are formed as a single unit.

18. The transmission system of claim 17, wherein the single unit is located between a first gear of the first gear ratio and a second gear of the second gear ratio.

* * * * *